US006322655B1

(12) United States Patent
Casagrande

(10) Patent No.: US 6,322,655 B1
(45) Date of Patent: Nov. 27, 2001

(54) SELF-LAMINATING INTEGRATED CARD AND METHOD

(75) Inventor: Charles L. Casagrande, Batavia, IL (US)

(73) Assignee: Precision Coated Products, Batavia, IL (US)

( * ) Notice: Subject to any disclaimer, the term of this patent is extended or adjusted under 35 U.S.C. 154(b) by 0 days.

(21) Appl. No.: 09/450,152

(22) Filed: Nov. 29, 1999

Related U.S. Application Data

(62) Division of application No. 09/144,132, filed on Aug. 31, 1998, now Pat. No. 6,022,051.

(51) Int. Cl.[7] ............................ B32B 31/18; B42D 15/10

(52) U.S. Cl. .......................... 156/257; 156/248; 156/253; 156/268; 156/277; 283/81; 283/82; 283/107; 283/108; 283/109; 40/625; 40/626; 40/675; 428/40.1; 428/41.8; 428/42.2

(58) Field of Search .................................... 156/253, 252, 156/257, 268, 270, 277, 248; 283/70, 81, 75, 94, 98, 101, 105, 110; 40/630, 626, 360, 674, 675, 625; 428/40.1, 41.8, 42.2

(56) References Cited

U.S. PATENT DOCUMENTS

| | | | |
|---|---|---|---|
| 2,545,804 | 3/1951 | Butler | 40/10 |
| 3,836,414 | 9/1974 | Staats | 156/87 |
| 3,854,229 | 12/1974 | Morgan | 40/2 |
| 4,004,058 | 1/1977 | Buros et al. | 428/215 |
| 4,185,405 | 1/1980 | Giulie | 40/2.2 |
| 4,325,196 | 4/1982 | Gauch et al. | 40/2.2 |
| 4,429,015 | 1/1984 | Sheptak | 428/201 |
| 4,456,639 | 6/1984 | Drower et al. | 428/13 |
| 4,497,872 | 2/1985 | Hoppe et al. | 428/483 |
| 4,560,426 | 12/1985 | Moraw et al. | 156/64 |
| 4,722,376 | 2/1988 | Rhyner | 150/147 |
| 4,768,811 | 9/1988 | Oshikoshi et al. | 283/82 |
| 4,889,749 | 12/1989 | Ohashi et al. | 428/13 |
| 4,890,862 | 1/1990 | Buchholz | 283/62 |
| 4,982,894 | 1/1991 | Schmidt | 229/69 |
| 4,991,878 | 2/1991 | Cowan et al. | 283/81 |
| 5,058,926 | 10/1991 | Drower | 283/109 |
| 5,090,736 | 2/1992 | Minkus | 283/77 |
| 5,096,229 | 3/1992 | Carlson | 283/75 |
| 5,131,686 | 7/1992 | Carlson | 283/75 |
| 5,135,263 | 8/1992 | Terwel | 283/112 |
| 5,172,938 | 12/1992 | Schmidt | 283/109 |
| 5,217,162 | 6/1993 | Shibahara | 229/92.8 |
| 5,249,828 | 10/1993 | Axelrod | 283/61 |
| 5,250,341 | 10/1993 | Kobayashi et al. | 428/137 |
| 5,281,474 | 1/1994 | Matsuzaki et al. | 428/349 |
| 5,312,136 | 5/1994 | Capozzola | 283/75 |
| 5,318,326 | 6/1994 | Garrison | 283/101 |
| 5,320,387 | 6/1994 | Carlson | 283/75 |
| 5,362,106 | 11/1994 | Longtin | 283/109 |

(List continued on next page.)

*Primary Examiner*—Linda Gray
*Assistant Examiner*—Cheryl N. Hawkins
(74) *Attorney, Agent, or Firm*—Thompson Coburn LLP; Grant D. Kang; Robert C. Haldiman

(57) ABSTRACT

A planar form or structure is used to create a laminated card or other planar article. The structure and related method allow the carrier surface of the laminated article to be customized or personalized, before it is laminated, such as by adding to the carrier surface an account number, signature, address, serial number, photograph, microchip, or other planar indicia. The carrier surface is adhered to the transparent lamina across substantially all its surface area to create a strong, tamper resistant bond. The laminated card is created from a multiple-ply structure defined within the boundaries of the larger form. The multiple-ply structure has horizontal dimensions substantially corresponding to the ultimate horizontal dimensions of the laminated card or article being created. The carrier is printable and able to be laminated on both sides, yet if desired, the carrier can be limited to only a single ply, thereby reducing the thickness of the resulting laminated card.

23 Claims, 6 Drawing Sheets

U.S. PATENT DOCUMENTS

| | | | |
|---|---|---|---|
| 5,429,700 | 7/1995 | Hudson | 156/253 |
| 5,462,488 | 10/1995 | McKillip | 462/26 |
| 5,466,013 | 11/1995 | Garrison | 283/107 |
| 5,509,693 | 4/1996 | Kohls | 283/75 |
| 5,518,787 | 5/1996 | Konkol | 428/43 |
| 5,529,345 | 6/1996 | Kohls | 283/75 |
| 5,543,201 | 8/1996 | Drower | 428/142 |
| 5,589,025 | 12/1996 | Garrison | 156/268 |
| 5,595,403 | 1/1997 | Garrison | 283/74 |
| 5,637,369 | 6/1997 | Stewart | 428/42.3 |
| 5,639,125 | 6/1997 | Garrison | 283/81 |
| 5,662,976 | 9/1997 | Popat et al. | 428/40.1 |
| 5,720,500 | 2/1998 | Okazaki et al. | 283/82 |
| 5,736,212 | 4/1998 | Fischer | 428/42.2 |
| 5,782,497 | 7/1998 | Casagrande | 283/110 |
| 5,794,981 | 8/1998 | Flynn | 283/109 |
| 5,830,561 | 11/1998 | Hagner | 428/195 |
| 5,839,763 | 11/1998 | McCannel | 283/109 |
| 5,842,722 | 12/1998 | Carlson | 283/107 |
| 5,890,743 | 4/1999 | Garrison et al. | 283/109 |
| 5,895,074 | 4/1999 | Chess et al. | 283/75 |
| 5,897,144 | 4/1999 | Uno | 283/77 |
| 5,915,733 | 6/1999 | Schnitzer et al. | 283/108 |

SELF-LAMINATING INTEGRATED CARD AND METHOD

This application is a division of and claims the priority of co-pending U.S. application Ser. No. 09/144,132 for SELF-LAMINATING INTEGRATED CARD AND METHOD to Charles L. Casagrande, filed Aug. 31, 1998 U.S. Pat. No. 6,022,051.

FIELD OF THE INVENTION

This invention relates generally to identification cards which are integrated into business forms and, more particularly, to identification cards which allow for both personal and manual lamination on both sides of the card, while occupying only the space of a single card on a business form.

BACKGROUND OF THE INVENTION

Wallet size identification cards have become quite prevalent over the past decade. Some examples of these cards are employee identification cards, membership cards, bond cards, insurance cards, and retailer preferred cards. Since these cards are often removed from wallets, handled, and replaced repeatedly throughout a day, they experience a great deal of wear. Moreover, these cards are often lost or stolen, which poses a security risk to the card holders as well as the card suppliers.

The increased demand for personal cards has provided card suppliers with three major obstacles: how to reduce or eliminate the wear on the card, how to safeguard against forgery, and how to package a partially pre-printed card while minimizing manufacturing costs.

For quite some time, card suppliers have addressed the wear problem while ignoring the security problem. Their solution was to use plastic cards instead of paper cards with the card holders placing their signatures on a designated location on the outer surface of the card. This practice has several drawbacks. Business indicia may be often scratched off or otherwise worn away through everyday use. In terms of security, wrongdoers may remove ink signatures from the designated location and place their own signatures on the card. In addition, wrongdoers may tamper with and alter a business' indicia, such as the company name, titles, and barcodes.

To minimize forgery, many companies take the extra step of laminating their cards after the card holders have signed their cards. In addition, some companies require their card holders to provide a small photograph, which is affixed to the cards prior to lamination. This extra step is costly in terms of time because it requires two mailings: a mailing from the card holder to the card supplier and a return mailing of the laminated card from the card supplier to the card holder.

Over the years, several techniques have been developed with regard to "packaging" a card. In short, packaging a card is simply finding a way to integrate a card into a business form, usually 8.5" by 11" in size, in such a way so that the card holder should be able to easily remove the card from the business form. Some of these techniques have also attempted to solve the problems of wear and forgery.

Non-Lamination

The non-lamination technique involves the printing of images using conventional printing equipment on heavy weight paper and perforating a portion of the paper to form the personal card. The card holders simply tear the card away from the rest of the form. The main problems with this technique are wear and forgery. Another disadvantage is the card has rough edges.

Single-Side Lamination

The single-side lamination technique involves coating of a portion of one side of a heavy weight paper with a lamina. The unlaminated side of the card may be used to print identifying information for the card supplier and user. The portion of the paper containing the card is perforated, with the lamina also being perforated along the edge of the card, for removal of the card from the business form.

One version of the single-side technique is disclosed in U.S. Pat. No. 3,854,229 [Morgan]. This technique involves a label consisting of four layers (from top to bottom): paper, release coating, adhesive and lamina, with all four layers being die-cut in a rectangular shape. Next, the paper and release coating are die-cut in similar rectangular dimensions, but smaller than the prior die-cut. Identifying information may be printed or written upon the label. A paper border is peeled away and the main paper face is peeled away from the bottom two layers, flipped over with the label face containing the printed information facing down, and inserted on top of the lamina layer. The label may then be adhered to any article to identify that article.

Another label, exhibiting the single-side technique, is disclosed in U.S. Pat. No. 5,639,125 [Garrison]. In one embodiment, the Garrison patent discloses a card consisting of the following seven layers: upper paper layer, upper adhesive, upper release, lamina, lower adhesive, lower release, and a lower paper layer. A first die-cut extends from the upper paper layer through the upper release layer, defining the shape of the label. A second die-cut extends from the upper paper layer through the lower release layer, but the perimeter is larger than that of the first die-cut. Identifying data may be written or printed on the upper paper layer, and peeled away from the other layers and adhered to an article. The remaining lamina may be removed from the backer adhered over the label resulting in the label having a laminated covering over its outer surface.

Another version of the single-side technique is disclosed in U.S. Pat. No. 5,462,488 [McKillip]. Generally, this single-side technique consists of four layers: upper material, lamina, removable adhesive, and lower material. A die-cut extends from the upper material through the removable adhesive, defining the shape of the card. The upper material may have identifying data written or printed onto it as desired. Next, the upper material and lamina are peeled away from the lower material, resulting in a card laminated on one side.

Similarly, a group of related patents to Garrison, U.S. Pat. Nos. 5,466,013; 5,589,025 and 5,589,025, disclose a single-side technique consisting of the following layers: a paper layer, pressure sensitive adhesive, upper lamina, dry adhesive, and lower lamina. A die-cut extends from the paper layer through the dry adhesive. The paper layer may have identifying data printed or written on it as desired. Because the dry adhesive is rupturable, the top three layers may be peeled away so that the resulting card is laminated on its backside.

The single-side technique has the disadvantage of wear, and it fails to safeguard against forgery. The paper side, which contains identifying indicia, and possibly a signature, remains exposed or, if the face of the card is laminated, the printing or signature is still not sealed. Thus, the paper may be torn, and the print and signature may be worn away or removed.

Double-Side Lamination

Exterior Printing/Signing Technique

The exterior printing/signing technique is disclosed in U.S. Pat. Nos. 5,096,229 and 5,131,686, both to Carlson. This technique consists of spot coating a portion of the front and back of heavy weight paper with lamina. Printing of identifying information is accomplished on the exterior of the lamina. A portion of the lamina is then perforated to allow card holders to remove the card from the form. The main disadvantage of this technique is the printing and signing occurs on the lamina, failing to address the problems of wear and forgery.

Foldover Technique

The foldover technique includes a group of patents teaching a common technique with slight variations. This technique, referred to as the foldover technique, generally involves coating the underside of paper with a strip of lamina, the length of two cards. After coating, the paper is die-cut in a rectangular pattern, having twice the length of one card, and a rectangular border is perforated. The large rectangle is divided into two halves by means of an additional perforation. One half of the double card is peeled away exposing the underlying lamina and adhesive layer with the other half carrying identifying indicia. Next, the entire rectangle of the double card is removed from the business form and the two halves of the double card are folded over onto each other along the additional perforation, with the lamina on the exterior and paper on the interior.

Another version of the foldover technique is taught in U.S. Pat. No. 5,509,693 [Kohls]. The card is made up of the following layers: lamina, adherent, release, and paper. The layers are applied in a coating that is roughly twice the length of one card, spanning nearly the entire width of a business form. The layers are perforated in the shape of a rectangle, roughly the length of two cards. To facilitate folding the lamina onto paper, another perforation is made, dividing the rectangle into two halves. On one half, the card holder may sign, print upon, or insert a picture on the paper. On the other half, the paper is fully die-cut and peeled away. Next, the entire rectangle may be peeled away from the form as one piece. The halves may be folded together, and an overlap of the lamina and adhesive fully encases the paper card.

Essentially the same technique is disclosed in U.S. Pat. No. 5,662,976 [Popat, et al.], U.S. Pat. No. 5,172,938 [Schmidt], and U.S. Pat. No. 5,318,326 [Garrison]. The Popat patent discloses printing capabilities and print feeding functions associated with laminated card business forms. Likewise, the Schmidt patent discloses different printing capabilities and grasping abilities for business forms. The Garrison patent, unlike the Schmidt and Popat patents, only discloses an identification card, as opposed to an identification card and associated business form.

Still another foldover technique is disclosed in U.S. Pat. No. 4,982,894 [Schmidt]. The Schmidt patent discloses a mailing envelope which includes a self-laminating card. The technique includes an envelope top and bottom and insert layers (from top to bottom): an informational paper sheet, paper card material perforated at the middle, release on one side of the perforation, adhesive on both sides of the perforation, and lamina on both sides of the perforation. Upon opening the envelope, the informational sheet may be read and removed. Next, the paper card and its attached release, adhesive, and film layers may be removed. The card may be pre-printed and may also be signed. The paper card on one side of the perforation may be peeled away exposing adhesive coated lamina. The adhesive coated lamina may then be folded over the face of the paper card to laminate the card on both sides.

Yet another version of the foldover technique was disclosed in U.S. Pat. No. 5,362,106 [Longtin]. This foldover technique involves an upper paper card and release liner, which are co-planar and adjoin each other at a die-cut where the card is folded. In order from top to bottom, the following layers are located below this layer: adhesive, polyethylene, polyurethane, polyethylene, adhesive, and business form. The card holder peels up the first three layers because the polyethylene layer releases from the polyurethane layer. Next, the card holder peels away the release liner, exposing one half of the adhesive coated polyethylene. This half is then folded over the paper card. The resulting paper card is covered on both sides by polyethylene.

Still another version of the foldover technique was disclosed in U.S. Pat. No. 5,637,369 [Stewart]. This version does not involve lamination, though it does teach a foldover technique. The Stewart patent teaches a label consisting of the following layers: an upper paper layer, upper adhesive, lower paper layer, lower adhesive, and release liner. The upper paper layer is die-cut down through the lower adhesive layer. The upper paper layer may contain printed indicia. Next, the top four layers may be peeled away from the release liner. After peeling, the label may be adhered to a package or another article. In a particular embodiment, the layers are perforated, creating two halves. After peeling, the label may be folded at the perforation, and the halves of the lower adhesive layer are adhered to themselves. The resulting label may exhibit printing on two sides.

Foldover/Punch Technique

The foldover/punch technique, as termed here, relates to the foldover technique discussed above combined with a punch technique. The punch technique relates to punching a card through a lamina layer, after which the lamina adheres to the card. The foldover/punch technique is disclosed in U.S. Pat. No. 5,518,787 [Konkol]. The Konkol patent discloses a technique which addresses the problem of two-step printing required by the foldover technique. With the foldover technique, in order to produce a card with print on both sides, two printing steps are required. One step requires printing upon the back of the card, followed by coating with release, adhesive, and lamina. A second step requires printing and signing the front side of the card. Two-step printing is required when both faces of the card lie in two planes, as in the previously mentioned foldover technique.

The foldover/punch technique in the Konkol patent allows for one-step printing, an improvement upon printing efficiency. This technique consists of the following layers: paper, release, adhesive, and film. As in the foldover technique, a cut is made through four layers, creating a rectangle having twice the length of a card. The rectangle is divided into two halves by perforating along the center line to ease the folding process. With the paper remaining exposed on the upper layer, in one step both halves of the card may be printed and/or signed. Next, the entire paper layer (both halves) is peeled away from the release layer leaving the adhesive and film layers in the form. The card holder then manually reinserts the printed/signed side of the double card into the space it formerly occupied and onto the adhesive coated lamina. The border of the lamina being larger than the card perimeter, the card adhered to the lamina may be punched out and folded over onto itself with the writing facing outward. In this fashion, the double card is reverse-folded and entirely encapsulated within the larger lamina layer with the lamina layer extending beyond the edges of the card.

The foldover technique and the foldover/punch technique are improvements upon all of the aforementioned techniques because the resulting card is laminated on both sides, protecting the paper from wear and impeding forgery, while packaging the card in a business form. However, there are several disadvantages associated with these techniques, in the areas of manufacturing and manual lamination. This type of card is difficult and costly to produce because it requires a double length lamination, must be die-cut from both sides, and has a lower manufacturing speed than the traditional, single card length lamination. The typical double length process operates at about 100 ft/min, as opposed to the typical single length process, which operates at about 400 ft/min. Furthermore, these techniques waste a significant amount of paper because one paper face is discarded per lamination. Moreover, these techniques are inefficient with respect to space usage because they consume the full width of a business form. Finally, the manual folding process is troublesome to the card holder. It is often difficult to properly align the lamina halves upon each other. Often times, when the lamina halves are momentarily misaligned the card becomes ruined, the entire business form must be thrown away, and the card supplier must bear the replacement costs.

Regarding the foldover/punch technique, another disadvantage of this technique is that only the outer edge of the lamina forms the bond between the two folded halves. A smaller bonding surface area results in a shorter life span for the laminated card. Furthermore, as in the foldover technique, the disadvantages regarding manufacturing and card holder difficulties are still present. Finally, an identification card made of two plies of folded paper is relatively thick and bulky, consuming valuable space in a wallet or card case.

Although some of the foregoing approaches have some degree of potential, they do not satisfy the needs of card suppliers and card holders in an economical, practical, and user-friendly manner. In particular, the foldover/punch technique addresses the needs of the card suppliers and card holders, but it presents new problems From all of the foregoing discussion, it is quite apparent that a significant need exists for a card integrating and lamination technique which overcomes the recognized problems, in a practical manner, which have faced card suppliers and card holders for so long without a viable solution.

Accordingly, an object of the present invention is to provide a double side laminated identification card.

Another object of the present invention is to allow for customization of the identification card prior to lamination, such as printing, signing, and photograph insertion.

Yet another object of the present invention is to consume only the space of a single card on a business form.

Another object of the present invention is to provide a double side laminated card that features a relatively large surface area bond between the exterior lamina layers, to ensure longevity of the lamination.

An additional object of the present invention is to provide a user-friendly manual lamination process.

Still another object of the present invention is to provide a thin and resilient, laminated identification card, consuming a minimal amount of space in a wallet or card case.

Yet another object of the present invention is to provide a business form which requires but a single pass to integrate the card patch with the business form and require only one die-cut and the use of a single die for the card patch.

Still yet another object of the present invention is to provide a card lacking heavy perforations so that the edges of the card feel as if they are clean cut.

SUMMARY OF THE INVENTION

There now has been discovered a structure or form, and a related method, for making a laminated card or other article. The structure comprises a multi-layered patch or multi-layer structure attached to a form, utilizing certain die-cuts. The patch or structure uses a single length lamination, allowing a card holder to print or write upon the paper card, and personally and manually laminate both sides of the card in a user friendly manner.

By using a particular arrangement of various layers of agents, the card supplier is presented with a business form, which houses a card defined by a die-cut and held in place by adherents. The card supplier may feed the form into a laser printer or ink jet printer for printing on the business form or card. Next, the card supplier may send the business form to the card holder. The card holder may then write upon the card, sign it, or even insert a small photograph. Next, the card holder peels away the top paper layer, flips it over, and inserts it back into the business form. The card is then punched out through the business form with lamina detaching from the form and attaching to the card. The end result is an identification card, laminated on both sides.

One aspect of the present invention involves a method of creating a planar structure with indicia thereon protected by overlying lamination. At least six layers are defined on a form for an end-user. The six layers lie substantially atop each other and include, from top to bottom (1) a carrier having an exposed surface for receiving indicia thereon; (2) a first adhesive; (3) a first transparent lamina; (4) a first release agent; (5) a second adhesive; and (6) a second transparent lamina. The method then entails making a substantially continuous cut through a first multiple-ply unit which comprises the carrier, first adhesive, first transparent lamina, and first release agent. The cut made therein defines an enclosed shape to one side of the cut and a remainder portion outside the enclosed shape. A pattern of slits and ties, such as perforations, is created in a second multiple-ply unit comprising the second adhesive and the second transparent lamina. Indicia are added to the exposed surface, then the first multiple-ply unit is separated from the second multiple-ply unit by releasing the release layer from the second adhesive layer. The removal of the first multiple ply unit creates a corresponding cavity in the end-user form and exposes the second layer of adhesive at the base of the cavity. The first multiple-ply unit is then inverted, which positions the first transparent lamina as an outer layer and the exposed surface of the carrier inside of such outer layer. The exposed surface is adhered across substantially all of its surface area to the second transparent lamina by inserting the first multiple-ply unit into the cavity in the inverted position until it substantially contacts the second adhesive layer. The resulting six-layer, planar structure has the first and second transparent laminas on the outer planar surfaces of the structure. The six-layer structure is then separated from the end-user form by applying force to the six-layer structure to rupture the pattern of perforations. The separated, six-layer structure has laminated layers on opposite planar sides and indicia protected underneath such laminated layers.

An information-carrying structure, according to another aspect of the current invention, is used for creating a laminated card for business, commerce, membership, identification, or the like. The structure includes multiple layers which substantially overlie each other. Representative layers are a carrier, a first adhesive layer, a first transparent lamina, a first release agent layer, a second adhesive layer, and a second transparent lamina. Cuts extend through the layers in a predetermined pattern to define an enclosed shape on the information carrying structure. The predetermined pattern also defines a remainder portion outside the enclosed shape. The enclosed shape has horizontal dimensions which substantially correspond to the dimensions of the card to be created. The carrier has an exposed surface on which indicia are placed and which are subsequently encapsulated when the laminated card has been created from the information-carrying structure. The carrier, the first adhesive layer, the first transparent lamina and the first release agent layer have portions within the perimeter of the enclosed shape, which portions define a first multiple-ply unit. The first multiple-ply unit has vertical edges which are substantially separated by the pattern of cuts from opposing edges of the remainder portion. In this way, the first multiple-ply unit is capable of being released from underlying portions of the second adhesive layer and the second transparent lamina. Opposing edges of the remainder portion, the second adhesive layer, and the second transparent lamina define a cavity approximately the size of the first multiple-unit when such unit has been released from the structure. The first multiple-ply unit, when inverted; the second adhesive layer; and the second transparent lamina combine to form a laminated structure corresponding to the laminated card. The resulting laminated structure is separated from the remainder portion by applying suitable shearing force thereto.

In accordance with another aspect of the present invention, the structure includes features which facilitate alignment of the first multiple-ply unit with the walls of the cavity in the structure at the time that the first multiple-ply unit is being replaced in such cavity. In one embodiment, there alignment features include at least one tab releasably joined to and extending from the enclosed shape. The tab is symmetrically located, that is, it remains in the same location relative to the perimeter of the enclosed shape, whether or not the first multiple-ply unit is in its inverted or initial position. A slot corresponding to the tab is likewise defined adjacent to the enclosed shape. In this way, alignment of the first multiple-ply unit is facilitated by guiding the tab into its corresponding spot.

In accordance with yet another aspect of the current invention, the structure also includes three component layers, including a carrier adhesive, a carrier lamina, and a release sublayer. The three component layers, together with the carrier, define a four-layer carrier subunit. The carrier subunit has perimeter portions defined therein which are suitably die-cut so they can be separated from the carrier subunit.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

DETAILED DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
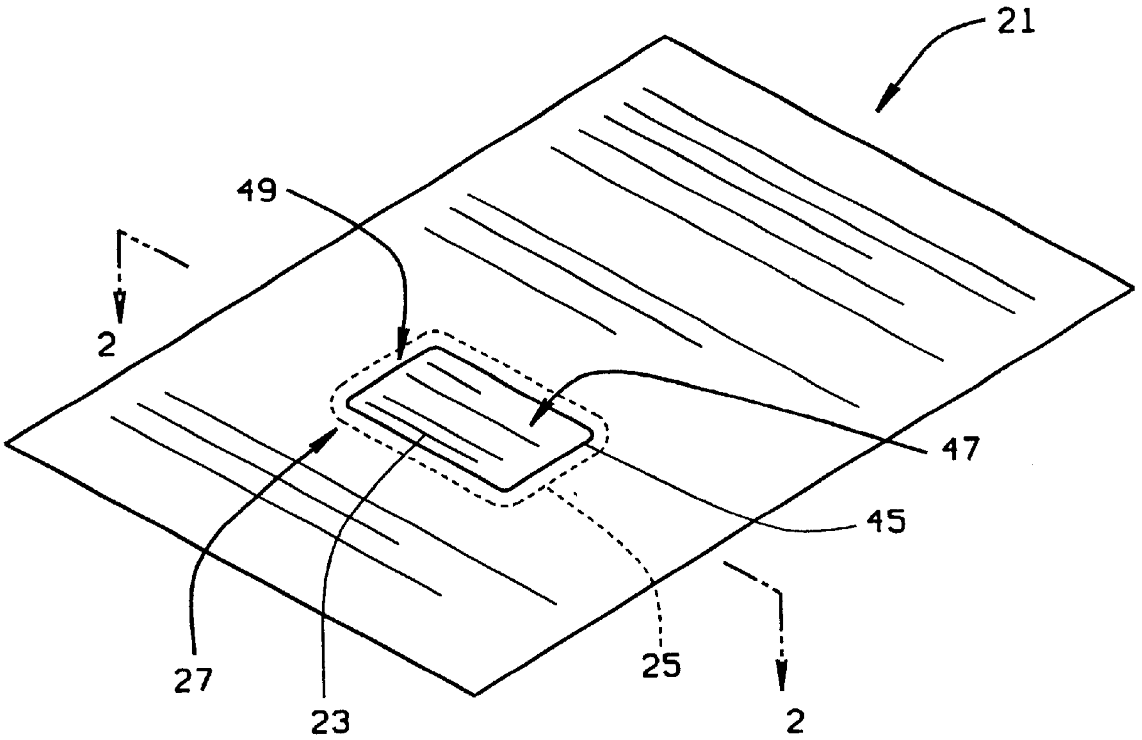
FIG. 1 is a perspective view of the self-laminating integrated card of the present invention.

Referring now to the drawings in detail, where like numerals refer to like parts or elements, and in particular to FIG. 1, there is shown an information-carrying structure 21. Structure 21 preferably comprises a form for creating a laminated card for business, commerce, membership, identification, and the like. As detailed below, the structure or form 21 includes features which permit indicia 23 to be added to the card and then be subsequently protected by a lamination layer to prevent unauthorized modification of such indicia.

Figure 5:
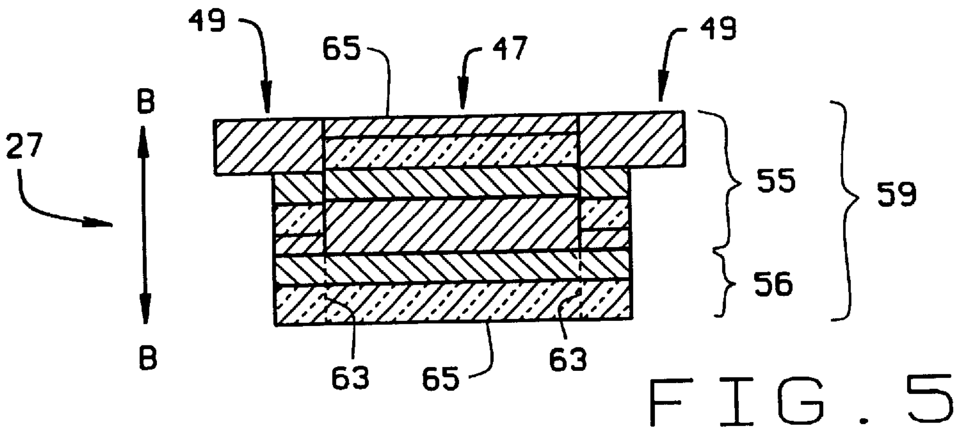
FIG. 5 is the cross-sectional view of the self-laminating integrated card of the present invention of FIG. 2 after inverting and reinsertion of the removed portion.
Figure 6:
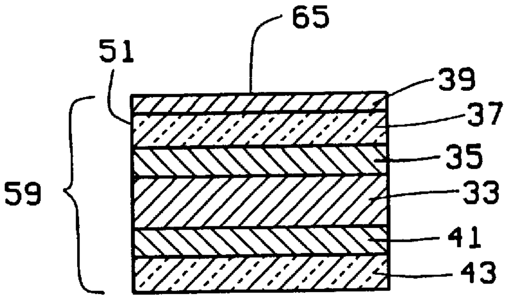
FIG. 6 is the cross-sectional view of the self-laminating integrated card of the present invention of FIG. 2 after the reinserted portion is punched out.
Figure 7:
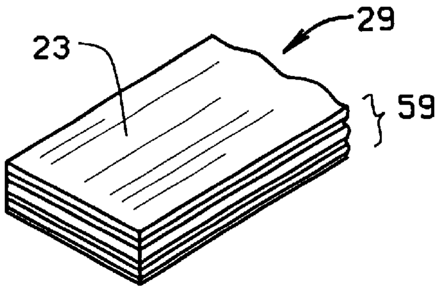
FIG. 7 is a perspective view of the punched out laminated card of FIG. 6.

Referring now generally to FIGS. 1–7, structure 21 includes a portion 25 carrying a multi-layer assembly or structure 27, which assembly, after various manipulative steps, is transformed into a laminated card 29, which is shown in finished form in FIG. 7.

Figure 2:
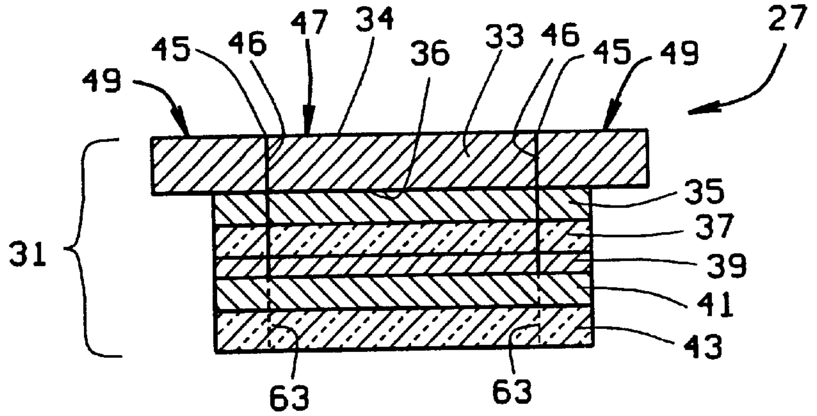
FIG. 2 is a cross-sectional view of the self-laminating integrated card of the present invention taken along Line 2—2 of FIG. 1.

Portion 25 of information-carrying structure 21 comprises a plurality of layers 31 which substantially overlie each other as best seen in FIG. 2. The layers 31 shown in the drawings are shown with exaggerated thicknesses for purposes of better illustrating the present invention. Still referring to FIG. 2, the multi-layer assembly or structure 27 includes six layers which are, from top to bottom: a carrier 33 having an exposed surface 34; a first adhesive layer 35; a first transparent lamina 37; a first release agent 39; a second adhesive layer 41; and a second transparent lamina 43. The release agent, lamina, and adhesive layers are selected so that the layers of multi-layer structure 27 remain secured to one another absent external shearing forces. The term "transparent," as used with reference to lamina, means not only clear plastic, but any condition short of complete opacity to light, including partial or selected regions of opacity, tinted effects, or certain holographic embedded substrates. The term "transparent" thus is used herein to embrace and include lamina which may be considered only partly clear or only somewhat transparent. Accordingly, the term "transparent" should not be limited merely to "clear" films.

The indicia 23 may be applied to exposed surface 34 of carrier 33 at any time or times prior to its lamination. For example, the printer or manufacturer of the structure or form 21 may apply indicia 23 to the exposed surface 34; a store or other commercial establishment may apply the indicia 23; or an end-user or customer receiving the structure or form 21 may sign or apply other personal indicia 23 to the exposed surface 34. After the desired information has been placed on the exposed surface 34, such surface can be laminated, that is, covered by a transparent lamina, in the manner discussed hereinafter. Carrier 33 has a back surface 36 opposite the exposed surface 34, and the back surface 36 may also be provided with indicia prior to placing layers 35–43 over it.

Layers 31 of the multi-layer structure 27 are die-cut or perforated with slits in a predetermined pattern 45. The pattern 45 defines an enclosed shape 47 on information-carrying structure 21 and a remainder portion 49 outside enclosed shape 47. Enclosed shape 47 has horizontal dimensions which substantially correspond to those of laminated card 29 [FIG. 7] to be created.

The pattern 45 of cuts includes a substantially vertical cut 46 which is substantially continuous along the perimeter of the enclosed shape 47. Vertical cut 46 extends through, but not beyond, the four upper layers as shown in FIG. 2, that is the carrier 33, first adhesive layer 35, first transparent layer 37, and first release layer 39. The cut 46 thus creates a first, multiple-ply unit 55 comprising the foregoing, four upper layers 33–39, and this multiple-ply unit 55 has its vertical edges 51 separated by the cut 46 from opposing edges 53 of remainder portion 49.

The pattern 45 of cuts also includes a perforation line 63 with an alternating procession of slits and ties therebetween. Perforation line 63 extends through the second adhesive layer 41 and second transparent lamina 43. As such, these layers 41, 43 form a second multiple-ply unit 56, which is secured to remainder portion 49 by the perforated line 63. The perforated line 63 is coextensive with the pattern of cuts 45, both patterns defining the enclosed shape 47.

Figure 3:
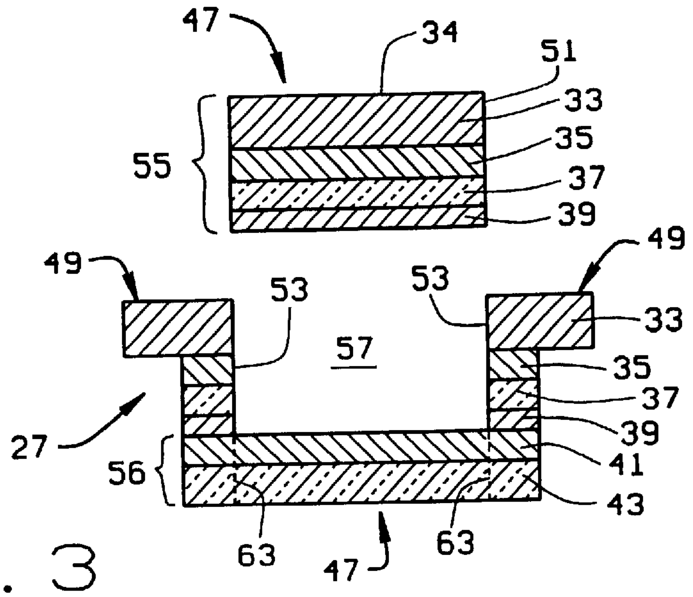
FIG. 3 is the cross-sectional view of the self-laminating integrated card of the present invention of FIG. 2 after peeling.
Figure 4:
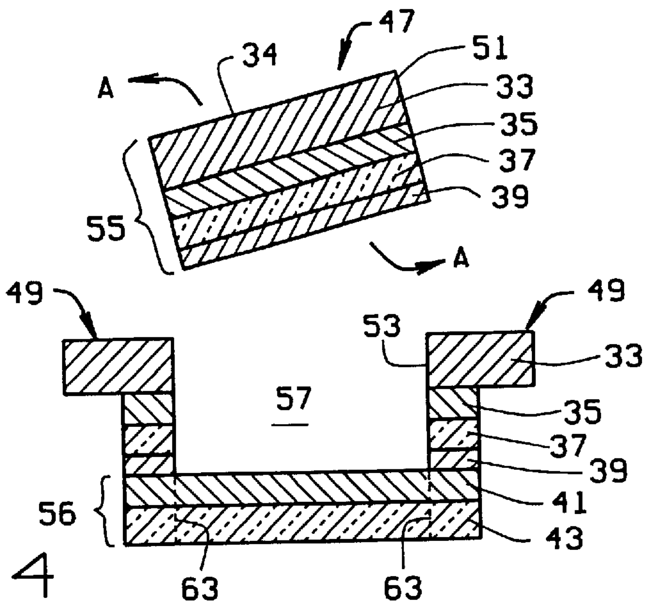
FIG. 4 is the cross-sectional view of the self-laminating integrated card of the present invention of FIG. 2 after peeling and showing the inverting of the removed portion.

The creation of the laminated card 29 from the first and second multiple-ply units 55, 56 is now described. Multiple-ply unit 55 is releasably adhered to the second multiple-ply unit 56 by surface contact between adhesive layer 41 and release layer 39. In this way, the first multiple-ply unit 55 can be released from information-carrying structure 21 along the boundary between release agent layer 39 and second adhesive layer 41, as best seen in FIGS. 3 and 4. When multiple-ply unit 55 is released, a cavity 57 is left behind. The walls of cavity 57 in structure 21 are defined by the opposing edges 53 of remainder portion 49, and the base of the cavity 57 is defined by portions of the second adhesive layer 41 and second transparent lamina 43.

The next step in forming laminated card 29 is to flip over or invert multiple-ply unit 55 by rotating unit 55 in the directions indicated by arrows A shown in FIG. 4. When unit 55 is inverted, exposed surface 34 and its carrier 33 are oriented toward cavity 57, and the first transparent lamina 37 is positioned to the outside of carrier 33, that is, as an outer layer.

Referring now to FIG. 5, the user inserts or replaces multiple-ply unit 55 into cavity 57 in the inverted position until multiple-ply unit 55 substantially contacts second adhesive layer 41. Such insertion causes first multiple-ply unit 55 to adhere to second adhesive layer 41, thus creating a resultant, six-layer structure 59.

The resulting six-layer structure 59 has a pair of opposite, outer surfaces 65. One of the outer surfaces comprises second transparent lamina 43, and the other of the outer surfaces 65 comprises first transparent lamina 37 and the release layer 39. Because the release layer 39 may be made relatively thin or fugitive, first transparent lamina 37 is essentially at one of the outer surfaces 65 and second transparent lamina 43 is at the other of the outer surfaces 65. In any event, by the foregoing manipulative steps, carrier 33 has now been encapsulated on both its planar sides by first and second transparent lamina 37, 43. Furthermore, exposed surface 34 of carrier 33 is adhered to second transparent lamina 43 across substantially all of the surface area of exposed surface 34 because the second adhesive layer 41 is substantially coextensive with the exposed surface 34 and lies between it and the second transparent lamina 43. As such, a strong bond is created between transparent lamina 43 and carrier 33 to resist tampering or mutilation of the resulting card structure 59.

The structure 59 is held in position within cavity 57 relative to remainder portion 49 by virtue of perforation lines 63 through second adhesive and second transparent lamina layers 41, 43. To remove structure 59 from its secured position, a manual or machine-generated force component is applied normal to the planar surfaces of the layers 31, such as in the direction indicated by arrows B in FIG. 5. Such forces create shear along perforation line 63, and a sufficient amount of force ruptures the slits and ties of perforation line 63, causing structure 59 to be separated from remainder portion 49 and the form 21, as shown in FIGS. 6 and 7. Once released, structure 59 can function as an encapsulated card 29 for identification, business transactions, membership, and the like, which includes layers 31 arranged from top to bottom as shown in FIG. 6 as follows: release agent layer 39, first transparent lamina 37, first adhesive layer 35, carrier 33, second adhesive layer 41, and second transparent lamina 43.

The vertical edges 51 of all the layers 31 are substantially coextensive with each other, meaning they lie in substantially the same vertical plane at corresponding edges of structure 59. In this way, planar surfaces 34, 36 of carrier 33 are encapsulated by overlying layers 33 and in particular, a layer of transparent laminate is positioned to the outside of both planar surfaces 34, 36 of carrier 33, inhibiting tampering or unintended modification of indicia 23 which may be carried on carrier 33.

The enclosed shape 47 in this embodiment is substantially rectangular and sized to correspond to a wallet-sized card; however, shape 47 can be varied to any size and can also be non-rectangular in form as the application may warrant. Indicia 23, similarly, can be added to exposed surface 34 of carrier 33 at any stage prior to its insertion into cavity 57, and such indicia 23 benefit from the protection that subsequent encapsulation in laminate layers provides. Indicia may thus be added to personalize the card 29 for the end-user thereof, such as by adding information such as name, signature, serial number, address, or account number.

Referring back to FIG. 1, the multilayer unit 27 secured to information-carrying form 21 has a horizontal dimension corresponding approximately to the horizontal dimensions of the resulting card 29. In other words, additional, horizontal "real estate" on the planar surface of form 21 is not required to create card 29 therefrom. Form 21 thus has only a single one of the multilayer structures 27 defined thereon, and this in turn makes fabrication of form 21 more efficient both in terms of speed of manufacture and associated cost.

As seen in FIGS. 1 and 2, the layers 31 are applied to back surface 36 of carrier 33 one atop the other and in substantial overlying relationship. If indicia are to be present on back surface 36, they are preferably applied prior to depositing the additional layers 31 onto surface 36. The layers of multi-layer structure 27 are applied to form 21 by any commercially available means suitable to the composition of the layer 31 being deposited thereon. Thus, adhesive layers 35 and 41 are applied by suitable spot gluers or other gluing apparatus; transparent lamina 37 and 43 are applied by apparatus capable of depositing laminate "patches" to selected locations on the larger form 21; and release layer 39 is deposited by means of appropriate apparatus. Alternatively, all layers 35–43 may be pre-laminated together and then applied as a single multi-layered "patch" by appropriate apparatus to the back of form or structure 21.

The thicknesses of layers 31, as well as other applicable characteristics thereof, such as the tack of adhesive layers and composition of the laminate and release layers, are generally selected so that the multi-layer structure, when mounted to form or structure 21, can be imprinted with indicia, die-cut, manipulated, and released without losing structural integrity or legibility of the surfaces of carrier 33. For example, suitable release agents include silicone applied as a coating. Suitable individual transparent laminas range in thickness from 1 to 8 mils, although thicknesses of as little as about 0.5 mils and as great as about 10 mils are appropriate for many applications, with the total thickness of the card structure being in the range of 4 to 25 mils. The material for the transparent laminas may be selected from any non-opaque materials, including glassine, polyester, polypropylene, and polystyrene. Second adhesive layer 41 is preferably of the pressure-sensitive type, with a Poliken probe tack selected to allow first multiple-ply unit 55 to be released therefrom without loss of structural integrity thereof. However, the adhesive is not solely determinative of the release. The chemical composition of the release layer, e.g. preferably, a silicone composite, is also a factor in determining releasability.

First adhesive layer 35 is preferably selected to have a permanent bond with carrier 33 so as to retain lamina 37 permanently adhered to the carrier 33. Release layer 39 preferably has a greater adhesion to the first lamina 37 than to second adhesive layer 41, so as to avoid inadvertent separation of multiple-ply unit 55, i.e. layers 35–39, from the back surface 36 of carrier 33 during release of the multiple-ply unit 55 from the remainder portion 49.

Carrier 33 is preferably formed integrally with the planar surface of form or structure 21. Although form 21 and carrier 33 may be made of any of a variety of flexible, sheet-like materials, they are preferably selected from suitable paperboard, cardstock, or paper. Carrier 33 may also be a planar sheet of polymeric material.

The arrangement of the layers 31 allows carrier 33 to have indicia 23 applied to one or to both planar surfaces (by pre-printing or affixing certain indicia on the back surface 36) and still comprise only a single sheet or ply. It is thus not necessary to form carrier 33 by folding over paper or cardstock into a two- or more-ply structure.

The resulting structure 59 includes six of the layers 31. It should be understood that in defining such six layers, the release agent, adhesive, and transparent layers are considered separate layers even though, in certain applications, such constituents may be applied so thinly as to not constitute a layer or lamina in the traditional sense of the word. Such microscopic lamina or partial layers are thus considered layers as that term is used herein, and are considered within the spirit and scope of the present invention.

Figure 8:
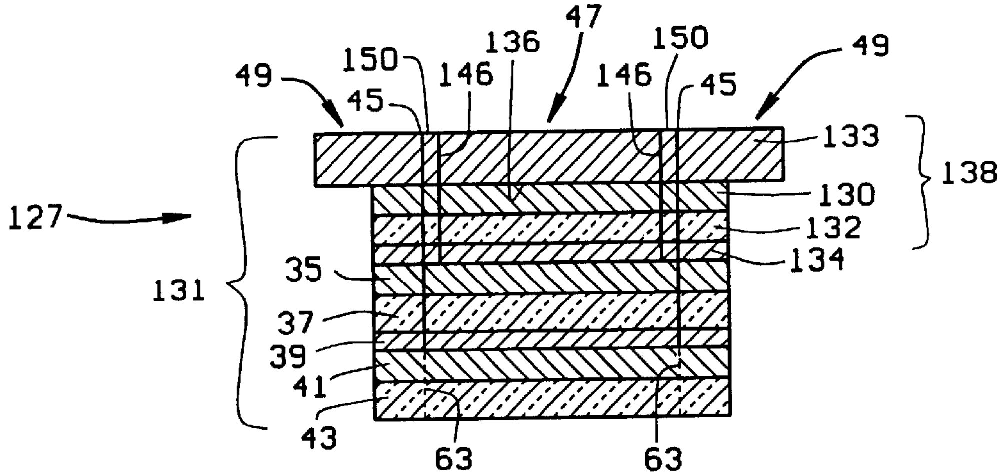
FIG. 8 is a cross-sectional view of a second embodiment of the self-laminating integrated card of the present invention.
Figure 9:
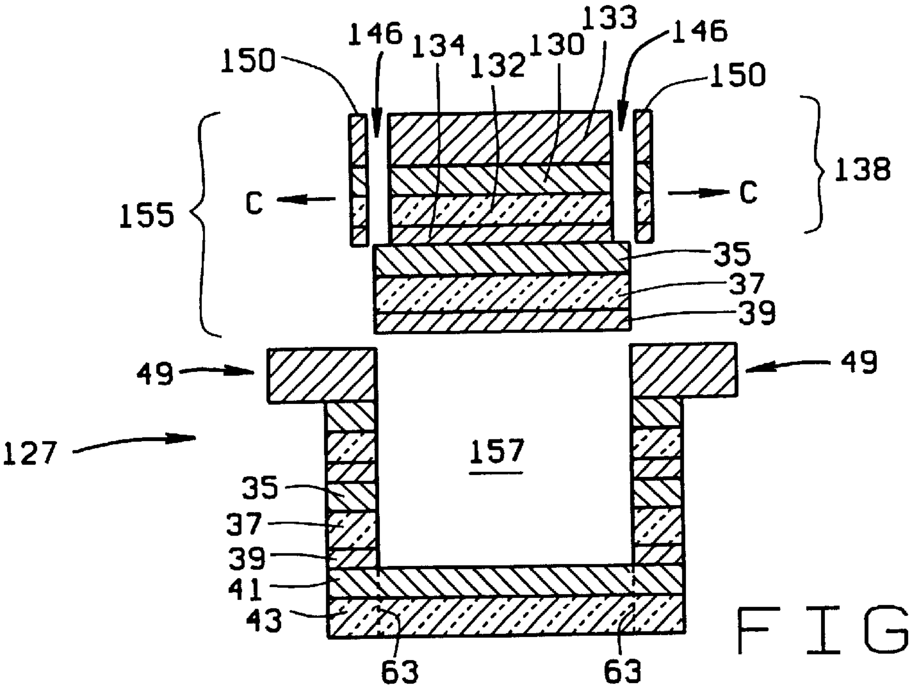
FIG. 9 is the cross-sectional view of the second embodiment of the self-laminating integrated card of the present invention after peeling and showing removal of perimeter portions.
Figure 10:
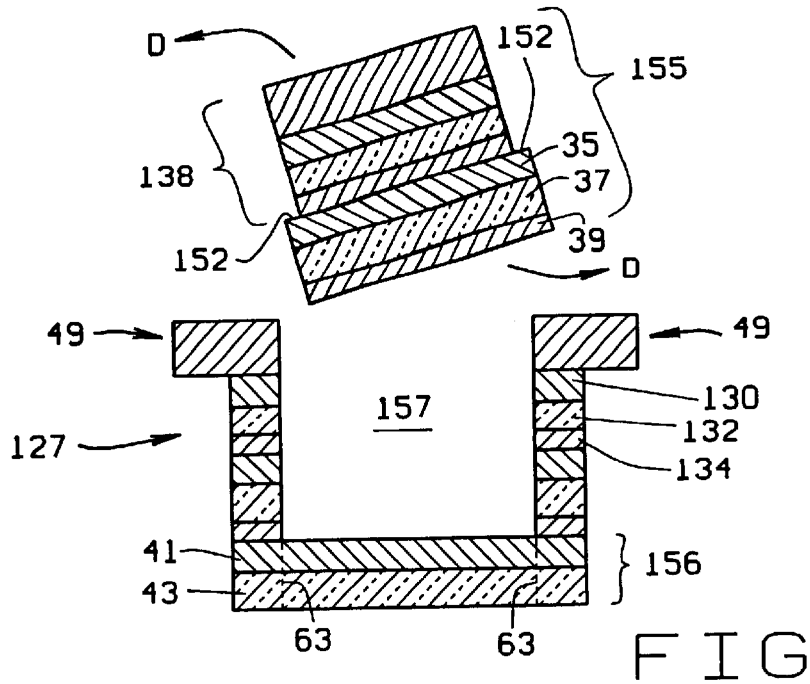
FIG. 10 is the cross-sectional view of the second embodiment of the self-laminating integrated card of the present invention after peeling and showing the inverting of the removed portion.
Figure 11:
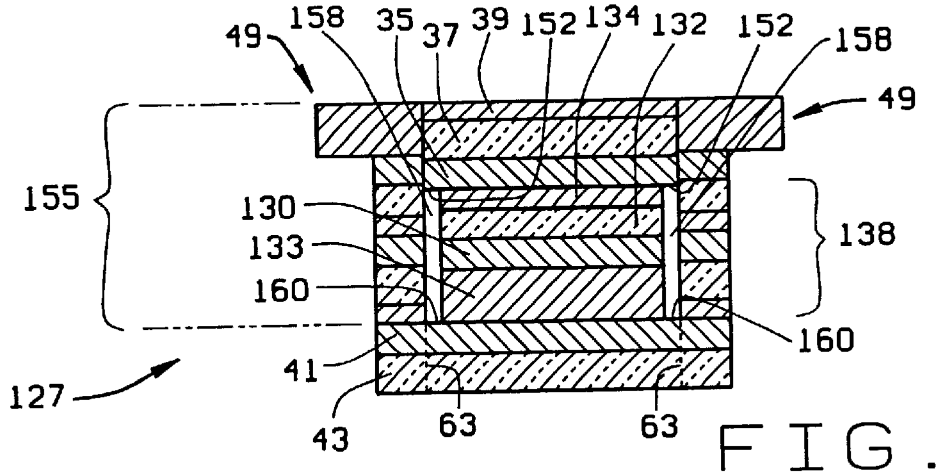
FIG. 11 is the cross-sectional view of the second embodiment of the self-laminating integrated card of the present invention after inverting and reinsertion of the removed portion.

Conversely, additional layers can be added to the structure 59 without departing from the spirit and scope of the present invention. For example, FIGS. 8 through 14 illustrate a second, preferred embodiment of the present invention. The multi-layer structure 127 includes the same six layers 31 in the same top to bottom arrangement as in multi-layer structure 27, except that carrier 133 comprises, three additional component layers 130, 132, and 134 interposed between back surface 136 of carrier 133 and first adhesive layer 35. In addition, carrier 133 and the additional component layers 132, 134, and 136, together comprise a carrier subunit 138, and the carrier subunit 138 has been cut, such as by die-cutting, to form a substantially continuous, additional cut 146. The additional cut 146 is located within the enclosed shape 47 defined by the predetermined pattern of cuts 45 and extends either in a closed circuit or between opposite sides of the enclosed shape 47. Accordingly, a pair of perimeter portions 150 is defined in all layers of the carrier subunit 138, the perimeter portions 150 extending horizontally as shown in FIGS. 8 and 9 between the additional cut 146 and the enclosed shape 47.

Component layers 130, 132, and 134 of carrier subunit 138 comprise, respectively, a carrier adhesive, a carrier lamina, and a release sublayer. The creation of the laminate card 129 (FIG. 14) from the nine-layer unit 127 shown in FIGS. 8–14 is accomplished using a method similar to that of the six-layer unit 27 discussed with reference to FIGS. 1–7, except for additional manipulative steps and advantages related to the additional component layers 130–134 and related to the additional cut 146. With particular reference to FIG. 9, first multiple-ply unit 155 includes carrier subunit 138, as well as first adhesive layer 35, first transparent lamina 37, and first release layer 39, and unit 155 is released from remainder portion 49 in the manner already described. The present invention also contemplates the use of only the additional release sublayer 134 and carrier 133 as comprising the carrier subunit 138, as the carrier 133 will be encapsulated within two lamina layers 37 and 43 (as described more fully hereinafter) without the need for the additional carrier lamina layer 132 or the carrier adhesive layer 130, so that the resulting structure will consist of only a seven-layer unit (not shown).

The presence of the additional, subrelease layer 134 makes it possible to remove first multiple-ply unit 155 as two pieces: the first comprising carrier subunit 138, the second comprising layers 35, 37, and 39 as a combined unit. The additional subrelease layer 134 also provides a means for readily removing perimeter portions 150 from carrier subunit 138. Perimeter portions 150 are preferably peeled from subrelease layer 134 along scoring lines or cuts 146 in the direction indicated by arrows C, and the perimeter portions 150 are then discarded and form no further part in creating card 129. Removal of perimeter portions 150 exposes portions 152 (FIGS. 10–13) of adhesive layer 35. Portions 152 are disposed generally in the planar direction of the structure 127.

First multiple-ply unit 155 is then inverted by rotation in the direction of arrows D (FIG. 10), unit 155 being rotated as either a single unit or in two pieces as discussed immediately above in reference to the release thereof. The inverted, released unit 155 is replaced into cavity 157 in a manner similar to that of the previous embodiment. In particular, carrier 133 is brought into contact with adhesive layer 41 across substantially all of the surface area of carrier 133 to strongly bond carrier 133 to second transparent lamina 43. After unit 155 has been inverted and returned to cavity 157 the following layers 31 overlie carrier 133 in succession: carrier adhesive 130, carrier lamina 132, release sublayer 134, first adhesive layer 35, first transparent lamina 37, and first release layer 39.

Figure 12:
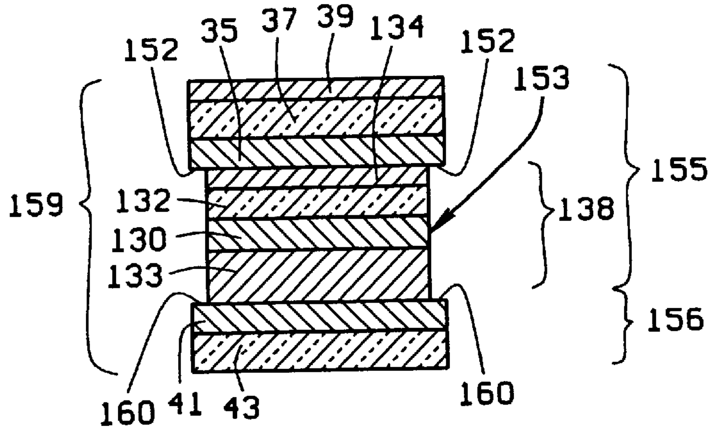
FIG. 12 is the cross-sectional view of the second embodiment of the self-laminating integrated card of the present invention after the reinserted portion is punched out and the perimeter portions stripped away.

As such, after the foregoing manipulations, a nine-layer structure 159 is formed with transparent lamina 37 and 43 positioned outside of carrier 133 to encapsulate it and protect indicia 23 (FIG. 14) thereon from undesired modification. Nine-layer structure 159 is pushed from remainder portion 49 by rupturing perforation lines 63 extending through layers 41, 43, after which the resulting structure 159 appears as shown in FIG. 12.

Figure 13:
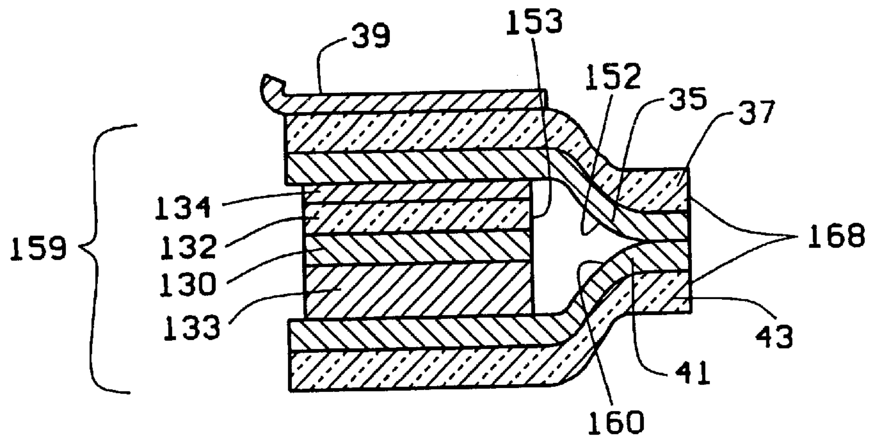
FIG. 13 is the cross-sectional view of the second embodiment of the self-laminating integrated card of the present invention showing the laminate overlap of the end portions.
Figure 14:
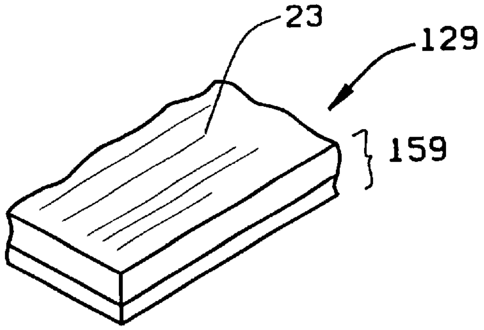
FIG. 14 is a perspective view of the second embodiment of the self-laminating integrated card of the present invention.

In this embodiment, structure 127 has the additional advantage of encapsulating vertical edges 153 of carrier subunit 138 with the laminate layers 37, 43, as is now described. Because perimeter portions 150 have been removed from the edges of carrier subunit 138, and because such portions previously occupied corresponding regions in cavity 157, gaps 158 are instead created when multiple-ply unit 155 is returned to cavity 157. The gaps 158, in turn cause the exposed portions 152 of first adhesive layer 35 to face opposing, exposed portions 160 of second adhesive layer 41 of second multiple-ply unit 156. Remembering that the thickness of layers 131 has been greatly exaggerated in the drawings, for clarity, it will be appreciated that the exposed portions 152 and 160 opposing each other across gaps 158 can be brought into contact with each other by applying suitable inward pressure to laminas 37 and 43. The adhesive layers 35 and 41 are thus adhered to each other at respective exposed portions 152, 160, as shown in enlarged section in FIG. 13. Carrier 133 not only has its planar surfaces protected by respective, laminas 37, 43, but also has its vertical edges 153 sealed by the laminas 37, 43 being adhered to each other at their outer edges 168 (FIG. 13). Moisture and other forces tending to separate the layers 131 of structure 127 are thus substantially prevented from acting at vertical edges 153 as a result of the foregoing encapsulation. Once adherence of the outer edges 168 is completed, the release layer 39 may be peeled away from its present location, the outer surface of lamina 37, as shown in FIG. 13. Alternatively the release layer 39 may remain and be worn away through use.

Figure 15:
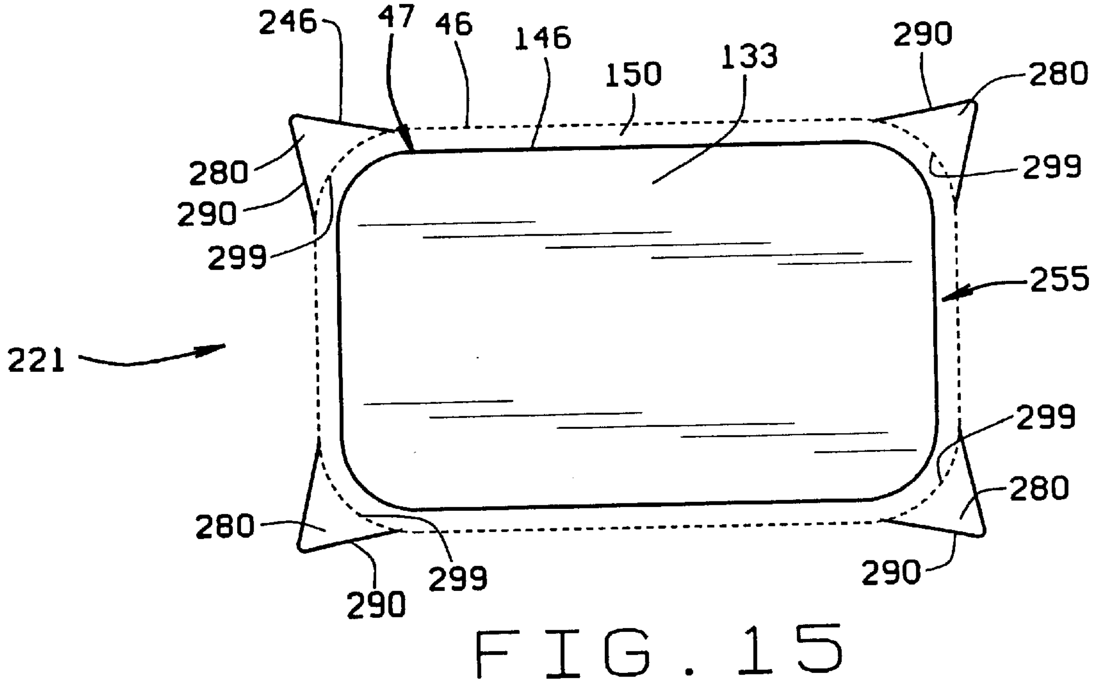
FIG. 15 is a top plan view of a third embodiment of the self-laminating integrated card of the present invention.

FIG. 15 shows a further modification to the foregoing embodiment. Substantially vertical cuts 246 are made, such as by die-cutting and perforating, to planar structure 221 to define four tabs 280. Cuts 246 are in addition to substantially continuous cut 46 and scoring line 146 which almost passes entirely through planar structure 221. It will be recalled from the discussion of the first embodiment that the cut 46 defines the enclosed space 47, and the scoring line 146 defines perimeter portions 150 as discussed in reference to the second embodiment shown in FIGS. 8–14. Accordingly, tabs 280 are suitably cut and scored by cuts 46 and 246 to be releasably joined to and extending from the corners of enclosed shape 47. Tabs 280 are symmetrically located about the perimeter of enclosed shape 47, that is, tabs 280 remain at the same location relative to the perimeter of enclosed shape 47 irrespective of whether first multiple-ply unit 255 is in the initial position shown in FIG. 15 or is instead inverted (as shown in FIG. 12) with respect to unit 155 of the previous embodiment. The symmetrical location of tabs 280 facilitates alignment of layers of the first multiple-ply unit 255 with the remaining layers of structure 221 when the multiple-ply unit 255 is released, inverted and reinserted in accordance with the steps discussed with reference to the two, preceding embodiments.

The process of defining tabs 280 in structure or form 221 also defines corresponding slots 290 at the vertical edges of form 221 which oppose tabs 280. In operation, then, when multiple-ply unit 255 is separated from structure or form 221, tabs 280 are separated along with unit 255 and corresponding slots 290 are defined in the cavity (not shown in this embodiment) formed by such removal. The end user first inverts the multiple-ply unit 255 as discussed with reference to the previous embodiments. Then, the tabs at the corners of the first multiple-ply unit 255 are aligned with corresponding slots and the unit 255 is reinserted into the form 221 to encapsulate carrier 133.

The tabs 280 are cut or perforated so that they remain with the first multiple-ply unit 255 during its manipulation, and are permanently adhered to the remainder portion upon reinsertion and after the card is completed and separated from form 221. In particular, tabs 280 have exterior edges 253 substantially continuously cut through the first, multiple-ply unit 255 and perforated through the second, multiple-ply unit, which, although not shown in this particular embodiment, is known from the other embodiments to underlie the first multiple-ply unit 255. Tabs 280 further have interior edges 299 formed by making substantially continuous cuts through carrier 133 and the underlying component layers of carrier subunit 138 discussed in the previous embodiment, and perforations extending through the remaining layers of structure 221.

The aligning function of the tabs 280 is particularly advantageous when used in conjunction with the embodiment of FIGS. 8–14 in which perimeter portions 150 have been removed, making the cavity somewhat larger than the multiple-ply unit 155 being reinserted therein. Tabs 280 can be disposed about enclosed shape 47 in alternate arrangements which are equally effective at facilitating alignment during reinsertion of the unit 255 into the form 221. In fact, a single one of the tabs 280 could be centered along one of the sides of the rectangle defined by enclosed shape 47, and such tab could be guided into its corresponding slot when reinserting unit 255.

Figure 16:
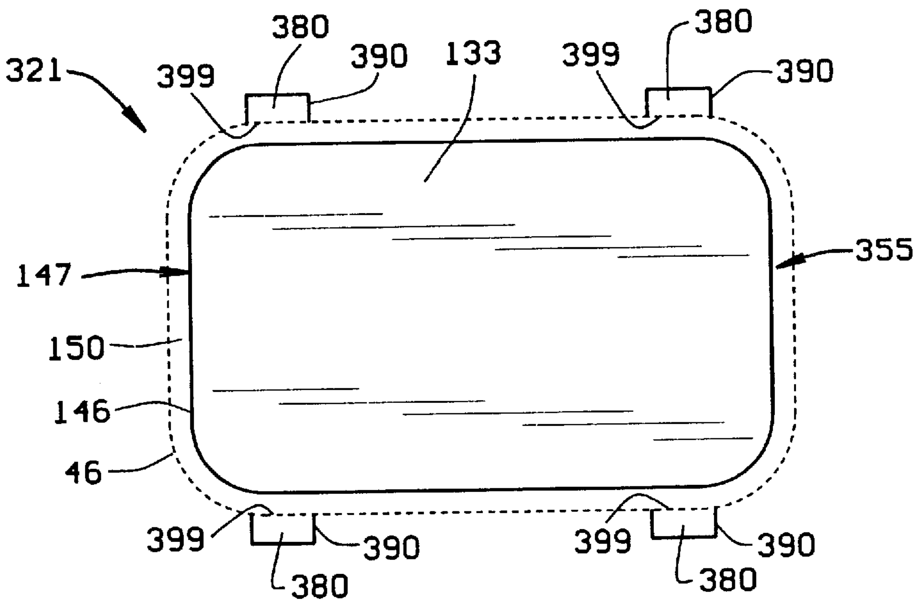
FIG. 16 is a top plan view of a fourth embodiment of the self-laminating integrated card of the present invention.

Similarly, FIG. 16 shows another alternate arrangement of tabs 380 defined by die-cutting and perforation to extend from and be releasably attached to the enclosed shape 47. Tabs 380 are at medial, symmetrical locations on the longer sides of the enclosed shape 47, the tabs 380 defined as rectangles themselves, rather than as triangular in the previous embodiment. In other respects, tabs 380 fulfill substantially the same function as tabs 280 already discussed, being alignable with corresponding slots 390 after the carrier 133 is manipulated and returned to the corresponding structure or form 321.

The structure or form of the present invention can be used for creating a variety of planar articles, with wallet-sized cards being only one of the many possible sizes and shapes. Likewise, indicia added to the carrier can take on innumerable forms, with the common denominator being that the indicia must be capable of lying substantially flat on the carrier surface or surfaces. Thus, while printed information, signatures, and other writings are suitable indicia for the present invention, additional indicia can include a photograph, holographic image, a microchip or other media for a so-called "smart card."

Figure 17:
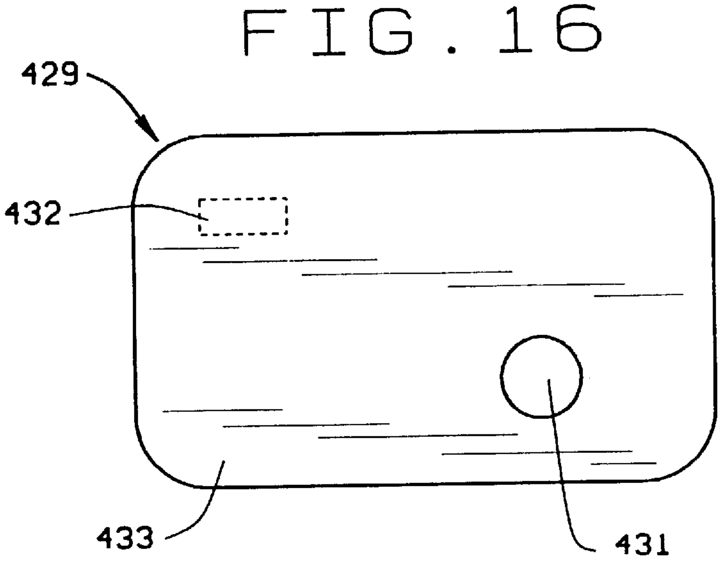
FIG. 17 is a top plan view of a fifth embodiment of the self-laminating integrated card of the present invention.
Figure 18:
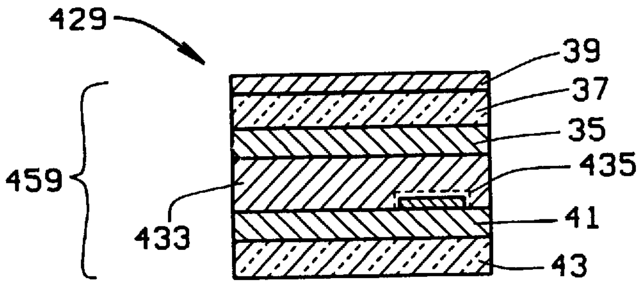
FIG. 18 is a cross-sectional view of the fifth embodiment of the self-laminating integrated card of the present invention.

For example, the card 429 shown in FIGS. 17 and 18 has a location 431 die-cut in carrier 433 for receiving an additional planar component thereon, in this case, a microchip 435. In addition, carrier 433 may have a holographic image or other visual graphic 432 applied thereto. Alternatively, the carrier 433 may be die-cut at 431 to create a removable portion leaving a cavity into which a photograph, fingerprint, or microchip may be inserted. The cavity extends to the second adhesive layer 41 to which the inserted item may be adhered. In all other respects, card 429 is similar to card 29 of the first embodiment, comprising a six-layer structure 459 which includes overlying, adjacent layers of a release layer 39, a first transparent lamina 37, a first adhesive layer 39, the carrier 433 (modified as described above), a second adhesive layer 41, and a second transparent lamina 43.

In addition to the advantages apparent from the foregoing description, the structure of the present invention allows a laminated card or other planar article to be created from the structure while taking up little horizontal space or "real estate" on the structure beyond the dimension of the card to be created. In other words, a card can be formed with lamination on both its opposite faces, yet without needing to take up horizontal space on the structure equivalent to about twice the dimension of the card.

The savings in "real estate" on the card also improve the speed at which the structures or forms of the present invention can be manufactured, as well as reducing the costs per form. As yet another advantage, the carrier is adhered to an opposing transparent lamina across substantially all of its surface area, creating a stronger, tamper-resistant bond thereby.

As still another advantage, indicia can be pre-printed on one or both sides of the carrier, other indicia can be printed or manually added, and then laminated on both sides without needing to fold the carrier or otherwise make use of a two-ply carrier. The ability to use a single-ply carrier with information laminated on both sides means that the resulting laminated card or other article is thinner, an important advantage when the card needs to be carried in a crowded billfold, purse, or pocket.

The alignment-facilitating features of the present invention have the advantage of allowing the end-user to release and invert the first multiple-ply unit and then resecure it to the structure relatively easily, with a greater likelihood that the resulting multiple-layer structure has its constituent layers substantially aligned with each other.

The ability of the present invention to provide sealed edges, which are relatively smooth, so as not to present an uneven portion to tear either the card or something the card touches and to protect the card from the infiltration of a liquid, such as water, from the carrier and spoiling the identifying indicia creates a unique advantage over other cards.

The present invention may be embodied in still other specific forms without departing from the spirit or essential attributes thereof and, accordingly, the described embodiments are to be considered in all respects as being illustrative and not restrictive, with the scope of the invention being indicated by the appended claims, rather than the foregoing detailed description. Furthermore, the appended claims indicate the scope of the invention, as well as all modifications which may fall within a range of equivalency, which are also intended to be embraced therein.

I claim:

1. A method for creating a planar article with indicia thereon protected by overlying lamination, comprising:

defining at least six layers on a form for an end-user, the six layers lying substantially one atop the other and including, from top to bottom, (1) a carrier having an exposed surface, (2) a first adhesive, (3) a first transparent lamina, (4) a first release agent, (5) a second adhesive, and (6) a second transparent lamina;

making a substantially continuous cut through a first multiple-ply unit comprising the carrier, first adhesive, first transparent lamina, and first release agent, the cut defining an enclosed shape having vertical edges to one side of the cut and a remainder portion having vertical edges outside the enclosed shape, the vertical edges of the enclosed shape being substantially separated from the opposing vertical edges of the remainder portion, the planar dimension of the enclosed shape generally corresponding to the planar dimension of the planar article to be created;

defining a pattern of slits and ties in a second multiple-ply unit comprising the second adhesive and the second transparent lamina layers along the perimeter of the enclosed shape;

adding indicia to the exposed surface of the carrier;

separating the first multiple-ply unit from the second multiple-ply unit by releasing the release layer from the second adhesive layer creating a corresponding cavity in the end-user form and exposing the second adhesive layer as the base of the cavity as a result of said separation;

inverting the first multiple-ply unit in relation to the second multiple-ply unit to position the first transparent lamina as an outer layer thereof and the exposed surface of the carrier as an inner layer thereof;

adhering the exposed surface of the carrier across substantially all of its surface area to the second transparent lamina by inserting the first multiple-ply unit into the cavity in the inverted position until it substantially contacts the second adhesive layer, thereby adhering the first multiple-ply unit to the second multiple-ply unit to create a six-layer structure having the first and second transparent laminas on outer, oppositely oriented planar surfaces thereof; and separating the six-layer structure from the end-user form by applying sufficient shear force to the six-layer structure to rupture the pattern of slits and ties, thereby creating the planar article with lamina layers on opposite planar sides and indicia protected underneath the lamina layers.

2. The method of claim 1, wherein the step of making the cut includes the step of die-cutting the pattern in a predetermined geometric shape having selected dimensions to define the planar article, and wherein the step of adding indicia further comprises the step of personalizing the planar article to be created by adding printed and manually applied end-user information selected from the group consisting of end-user name, end-user signature, identification numbering, bar-code numbering and end-user address.

3. The method of claim 1, wherein the step of creating the six-layer structure on the end-user form comprises the step of defining only a single one of the structures thereon.

4. The method of claim 1, wherein the vertical edges of the two multiple-ply units are substantially coextensive.

5. The method of claim 1, wherein the carrier layer comprises only a single ply.

6. The method of claim 5, wherein the carrier is selected from the group consisting of paperboard, cardstock, paper, and polymeric material.

7. The method of claim 1, further comprising the steps of:

selectively making substantially vertical cuts in the planar structure to define at least one tab releasably joined to and extending from the enclosed shape, the tab being symmetrically located so as to remain in the same location relative to the perimeter of the enclosed shape irrespective of whether the first multiple-ply unit is inverted;

defining at least one corresponding slot in the vertical edges of the end-user form which oppose the tab;

vertically aligning the tab with the corresponding slot after the first multiple-ply unit has been inverted; and inserting the tab into the slot to facilitate alignment of the layers of the planar structure.

8. The method of claim 7, wherein the step of making cuts to define the tab comprises the step of making selected cuts at symmetrical locations on opposite sides of the structure to define at least two of the tabs.

9. The method of claim 7, wherein the step of making cuts to define the tab further comprising the step of die-cutting a plurality of the tabs at symmetrical locations on the perimeter of the enclosed shape.

10. The method of claim 1, wherein the carrier comprises three, additional component layers, the component layers including (a) a carrier adhesive, (b) a carrier lamina, and (c) a release sublayer, the three component layers and the carrier defining a carrier subunit, and further comprising the steps of:

making additional, substantially continuous cuts through the carrier subunit at locations within the enclosed shape to define perimeter portions extending between the additional cuts and the enclosed shape;

removing the perimeter portions of the carrier subunit to expose corresponding portions of the first transparent lamina and first adhesive; and after the steps of inverting and inserting the first multiple-ply unit, securing the exposed portions of the first transparent lamina to opposing locations on the second transparent lamina by means of the first adhesive positioned between the first and second transparent lamina, the edges of the first and second lamina encapsulating the vertical edge of the carrier located therebetween.

11. The method of claim 10, further comprising the steps of:

selectively making substantially vertical cuts in the planar structure to define at least one tab releasably joined to and extending from the enclosed shape, the tab being symmetrically located so as to remain in the same location relative to the perimeter of the enclosed shape irrespective of whether the first multiple-ply unit is inverted;

defining at least one corresponding slot in the vertical edges of the end-user form which oppose the tab;

vertically aligning the tab with the corresponding slot after the first multiple-ply unit has been inverted; and inserting the tab into the slot to facilitate alignment of the layers of the planar structure.

12. The method of claim 11, wherein the step of making the cut includes the step of die-cutting the pattern in a predetermined geometric shape having selected dimensions to define the planar article; and wherein the step of making cuts to define the tab further comprising the steps of:

die-cutting a plurality of the tabs in locations extending from the corners of the enclosed shape;

cutting an exterior edge of the tabs by making substantially continuous cuts through the first multiple-ply unit; and cutting an interior edge of the tabs by making perforation cuts through the carrier subunit and through the remaining layers of the structure.

13. The method of claim 11, wherein the step of making cuts to define the tab comprises the step of making selected cuts at symmetrical locations on opposite sides of the structure to define at least two of the tabs.

14. The method of claim 11, wherein the step of making cuts to define the tab further comprising the step of die-cutting a plurality of the tabs at symmetrical locations on the perimeter of the enclosed shape.

15. The method of claim 1, wherein the carrier comprises an additional component layer, said additional layer being a release sublayer, the additional component layer and the carrier defining a carrier subunit, and further comprising the steps of:

making additional, substantially continuous cuts through the carrier subunit at locations within the enclosed shape to define perimeter portions extending between the additional cuts and the enclosed shape;

removing the perimeter portions of the carrier subunit to expose corresponding portions of the first transparent lamina and first adhesive; and after the steps of inverting and inserting the first multiple-ply unit, securing the exposed portions of the first transparent lamina to opposing locations on the second transparent lamina by means of the first adhesive positioned between the first and second transparent lamina, the edges of the first and second lamina encapsulating the vertical edge of the carrier located therebetween.

16. The method of claim 15, further comprising the steps of:

selectively making substantially vertical cuts in the planar structure to define at least one tab releasably joined to and extending from the enclosed shape, the tab being symmetrically located so as to remain in the same location relative to the perimeter of the enclosed shape irrespective of whether the first multiple-ply unit is inverted;

defining at least one corresponding slot in the vertical edges of the end-user form which oppose the tab;

vertically aligning the tab with the corresponding slot after the first multiple-ply unit has been inverted; and inserting the tab into the slot to facilitate alignment of the layers of the planar structure.

17. The method of claim 16, wherein the step of making the cut includes the step of die-cutting the pattern in a predetermined geometric shape having selected dimensions to define the planar article; and wherein the step of making cuts to define the tab further comprising the steps of:

die-cutting a plurality of the tabs in locations extending from the corners of the enclosed shape;

cutting an exterior edge of the tabs by making substantially continuous cuts through the first multiple-ply unit; and cutting an interior edge of the tabs by making perforation cuts through the carrier subunit and through the remaining layers of the structure.

18. The method of claim 16, wherein the step of making cuts to define the tab comprises the step of making selected cuts at symmetrical locations on opposite sides of the structure to define at least two of the tabs.

19. The method of claim 16, wherein the step of making cuts to define the tab further comprising the step of die-cutting a plurality of the tabs at symmetrical locations on the perimeter of the enclosed shape.

20. The method of claim 1, further comprising the step of defining a location on the exposed surface of the carrier for receiving an additional planar component thereon, and placing the planar component at the defined location prior to adhering the exposed surface to the second transparent lamina.

21. The method of claim 20, wherein the step of placing the planar component comprises the step of mounting a component selected from the group consisting of a microchip, a holographic image, a graphical image, and a photograph.

22. The method of claim 1, further comprising the steps of:

forming the carrier integrally with the end-user form, the carrier having a back surface opposite the exposed surface, the back surface adjacent to and opposing the first adhesive adjacent to the carrier, the other layers of the structure being applied serially to the back surface and first adhesive thereon; and applying indicia to the back surface prior to applying the other layers of the structure to the back surface; resulting in the planar article having indicia on both sides of the carrier, the indicia being laminated to avert modifications thereto.

23. The method of claim 1, further comprising the step of placing the six layers immediately adjacent to each other without any intervening layers.

* * * * *